(12) United States Patent
Lopes et al.

(10) Patent No.: US 7,907,423 B2
(45) Date of Patent: Mar. 15, 2011

(54) MODULAR POWER DISTRIBUTION ASSEMBLY AND METHOD OF MAKING SAME

(75) Inventors: Ednei Lopes, Braganca Paulista/SP (BR); Aguinaldo Vicenza, Braganca Paulista/SP (BR); Alexandre Perussi, Atibaia/SP (BR)

(73) Assignee: Tyco Electronics Brasil Ltda., Sao Paulo (BR)

( * ) Notice: Subject to any disclaimer, the term of this patent is extended or adjusted under 35 U.S.C. 154(b) by 503 days.

(21) Appl. No.: 11/867,036

(22) Filed: Oct. 4, 2007

(65) Prior Publication Data

US 2009/0091183 A1    Apr. 9, 2009

(51) Int. Cl.
*H01R 9/00* (2006.01)
(52) U.S. Cl. ......... 361/822; 361/823; 361/826; 361/833; 361/731; 361/630; 439/76.2
(58) Field of Classification Search .................. 361/630, 361/646, 731, 819, 822–824, 827, 833; 439/76.2
See application file for complete search history.

(56) References Cited

U.S. PATENT DOCUMENTS

| | | | | |
|---|---|---|---|---|
| 4,940,419 A | * | 7/1990 | Kurita et al. | 439/271 |
| 5,179,503 A | | 1/1993 | Fouts et al. | |
| 5,568,361 A | * | 10/1996 | Ward et al. | 361/735 |
| 5,581,130 A | | 12/1996 | Boucheron | |
| 5,777,843 A | | 7/1998 | Younce | |
| 6,027,360 A | * | 2/2000 | Jenkins | 439/364 |
| 6,881,100 B2 | * | 4/2005 | Barry et al. | 439/701 |
| 7,591,653 B2 | * | 9/2009 | Boileau et al. | 439/76.2 |

FOREIGN PATENT DOCUMENTS

WO    WO 98/18180    4/1998

OTHER PUBLICATIONS

PCT International Search Report; International Application No. PCT/US2008/011258; International Filing Date Sep. 29, 2008.

* cited by examiner

*Primary Examiner* — Dameon E Levi

(57) ABSTRACT

A modular electrical power distribution assembly is provided. The assembly includes a plurality of modular containers, each container configured to receive electrical components for interconnection to electrical systems of a predetermined configuration. The plurality of containers is configured for mechanical interconnection.

18 Claims, 11 Drawing Sheets

MODULAR POWER DISTRIBUTION ASSEMBLY AND METHOD OF MAKING SAME

FIELD OF THE INVENTION

The present disclosure relates generally to electrical power distribution systems, more particularly, to modular power distribution systems.

BACKGROUND OF THE INVENTION

Electrical power distribution to electrical circuits is required for operation of systems and subsystems of devices such as automobiles. Components required for power distribution typically include various electrical components such as fuses, relays, diodes, circuit breakers etc., which are usually housed in one container or box for connection to the battery, alternator and a master wire harness. The number and type of electrical components required for power distribution depends upon the electrical requirements of the particular automobile.

Presently, power distribution box housings are designed to be unique to the respective automobile model. Moreover, for the same automobile model, there may exist several configurations corresponding to packages of features offered. Customers select different packages based on price and/or preferences, the deluxe packages typically requiring additional electrical components, and thus, power distribution boxes of increased size. However, irrespective the configuration selected, the same power distribution box housing is used for each automobile, representing a waste in both material and space for configurations of power distribution box housings not requiring the additional electrical components.

What is needed is a power distribution construction comprised of modules that require minimal space and materials required for each of multiple versions of an electrically powered vehicle.

SUMMARY OF THE INVENTION

The present disclosure relates to a modular electrical power distribution assembly. The assembly includes a plurality of modular containers, each container configured to receive electrical components for interconnection to electrical systems of a predetermined configuration. The plurality of containers is configured for mechanical interconnection.

The present disclosure further relates to a method of making a modular electrical power distribution assembly. The method includes providing a plurality of modular containers, each container configured to receive electrical components for interconnection to electrical systems of a predetermined configuration. The method further includes installing the electrical components in each of the plurality of containers and mechanically interconnecting the plurality of containers.

The present disclosure further relates to a vehicle. The vehicle includes a frame supporting a propulsion device and electrical systems for use with electrical components of the vehicle. The frame supports a plurality of modular containers, each container configured to receive electrical components for interconnection to vehicle electrical systems for a predetermined vehicle configuration. The plurality of containers are configured for mechanical interconnection.

An advantage of the present disclosure is that the power distribution system requires minimal space and materials.

A further advantage of the present disclosure is that the power distribution system includes interlocking or interconnected components.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 5:
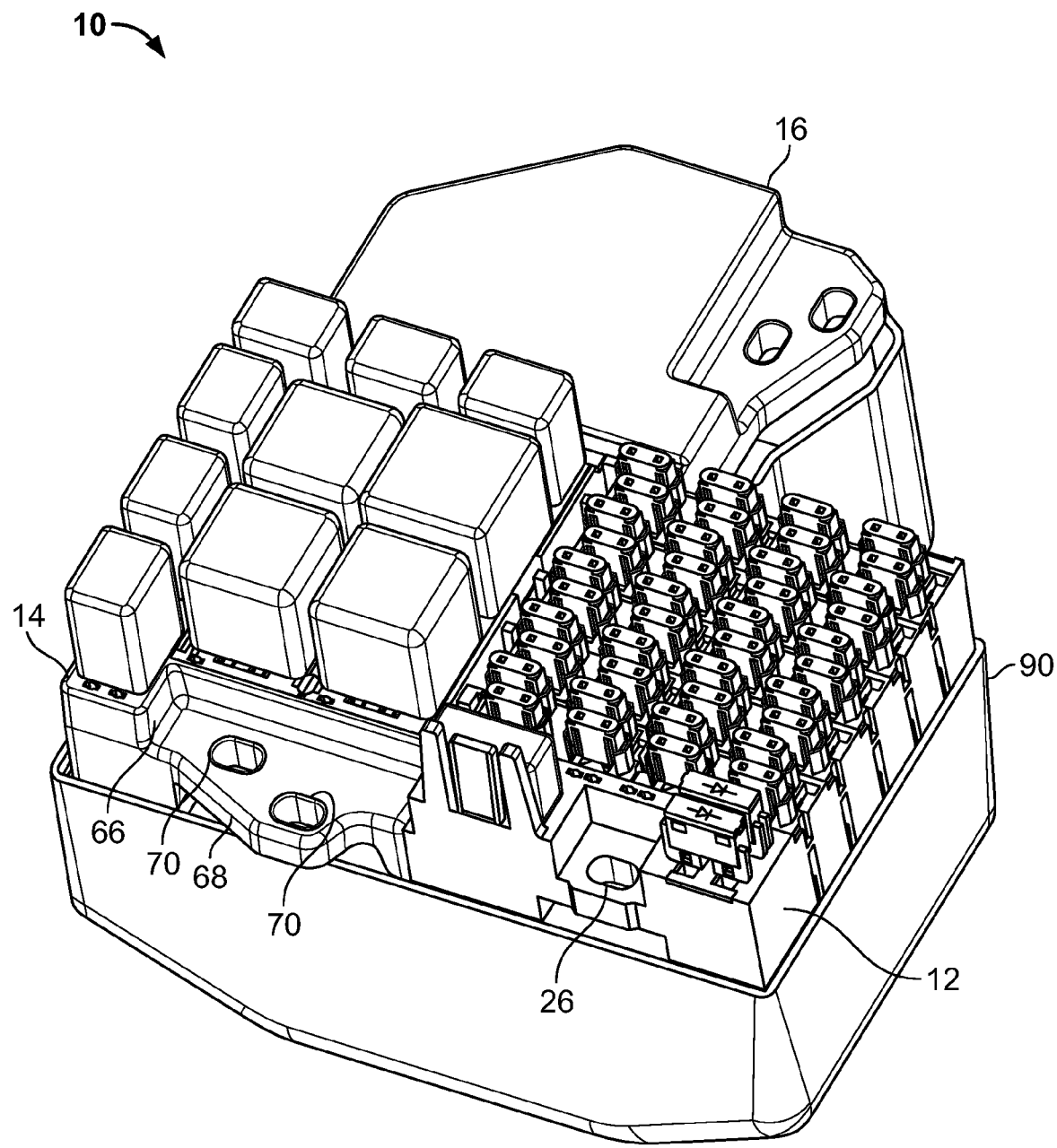
FIGS. 5-7 are top perspective views of alternative embodiments of electrical power distribution assemblies of the present invention.
Figure 6:
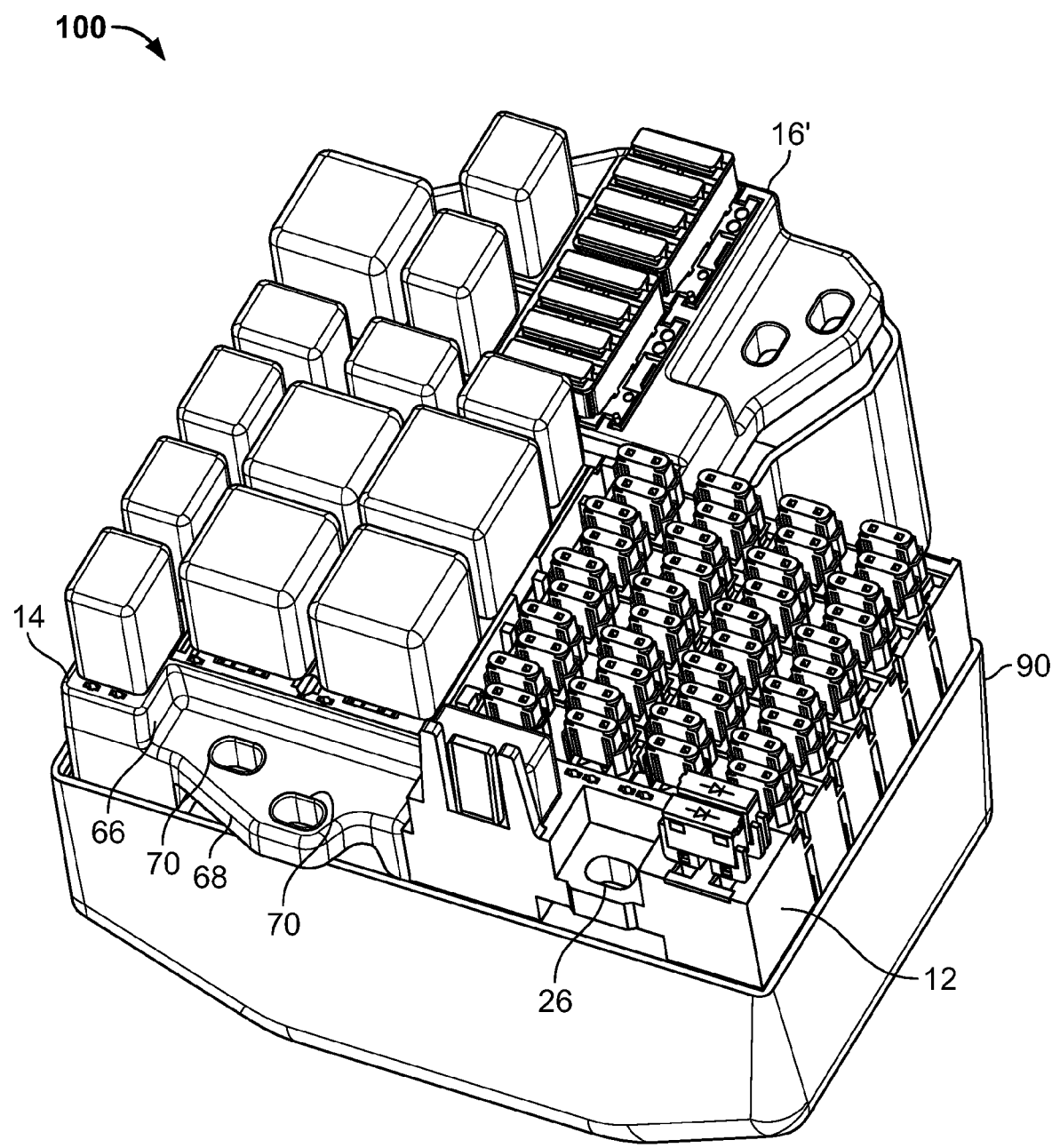
Figure 7:
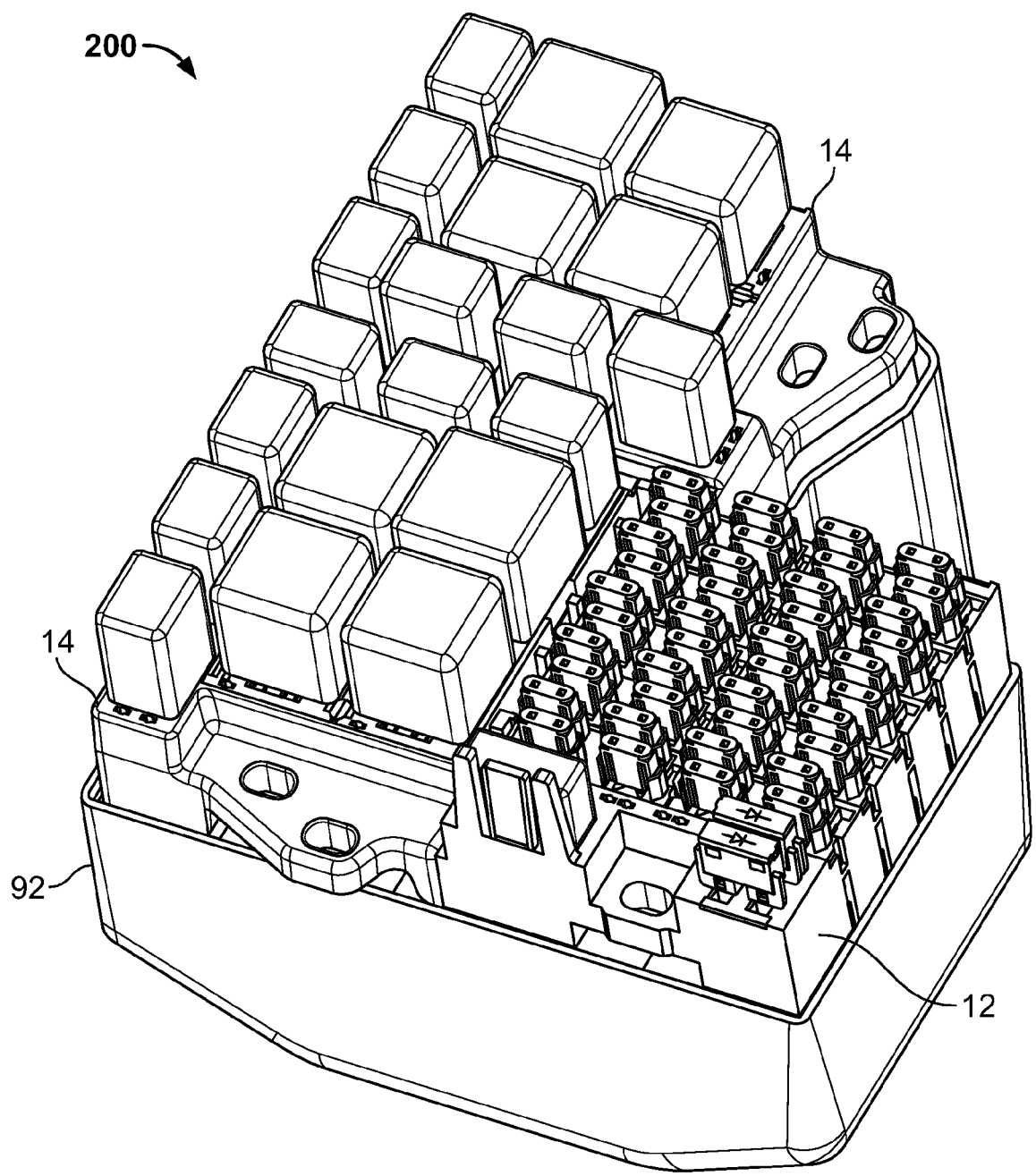

Referring to FIGS. 5-7, electrical power distribution assemblies 10, 100, 200 according to the present invention are configured for use with providing electrical power distribution to electrical systems, such as electrical systems of a device (not shown). In one embodiment, the device is a vehicle usable on ground, sea or air, such as an automobile, boat, aircraft or other construction having a frame supporting a propulsion device and electrical systems for use with electrical components of the device. The electrical power distribution assemblies 10, 100, 200 (see FIGS. 5-7) utilize different combinations of modular containers 12, 14 and fixturing modules 16 (FIG. 5) and 16' (FIG. 6) in order to satisfy different sets of electrical requirements, or versions, for the same vehicle. That is, one vehicle may have different equipment packages provided with different models or versions of the same vehicle. By virtue of various modular containers, different electrical requirements may be satisfied while optimizing both space in the vehicle and materials, as the size of the modular containers is minimized. In one embodiment, modular containers are minimized by configuring the modular containers to be fully populated with electrical components. In other words, in this embodiment, all available space of each modular container may be filled with electrical components, and each electrical component performs a function in the vehicle electrical system.

Figure 1:
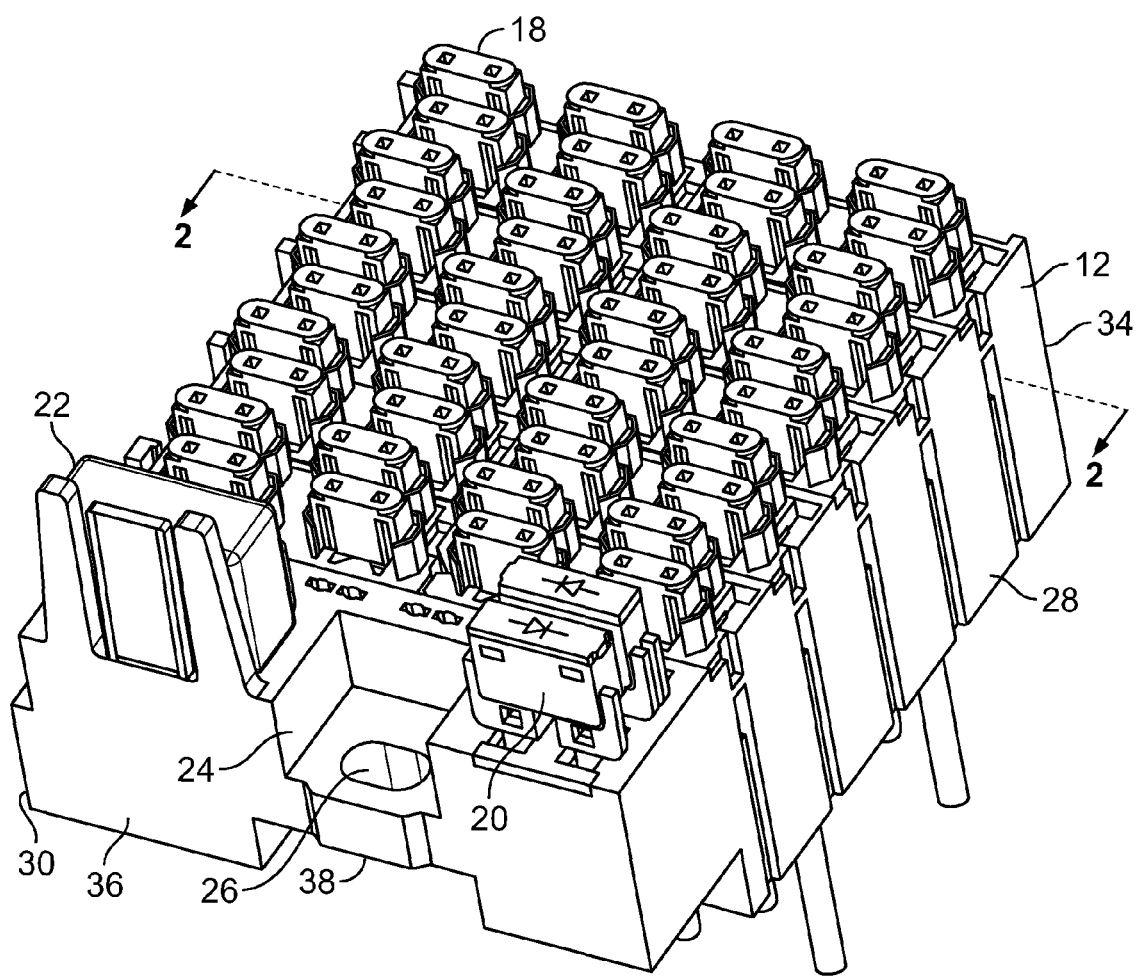
FIGS. 1 and 1A are opposed top perspective views of a modular container embodiment of the present invention.
Figure 1A:
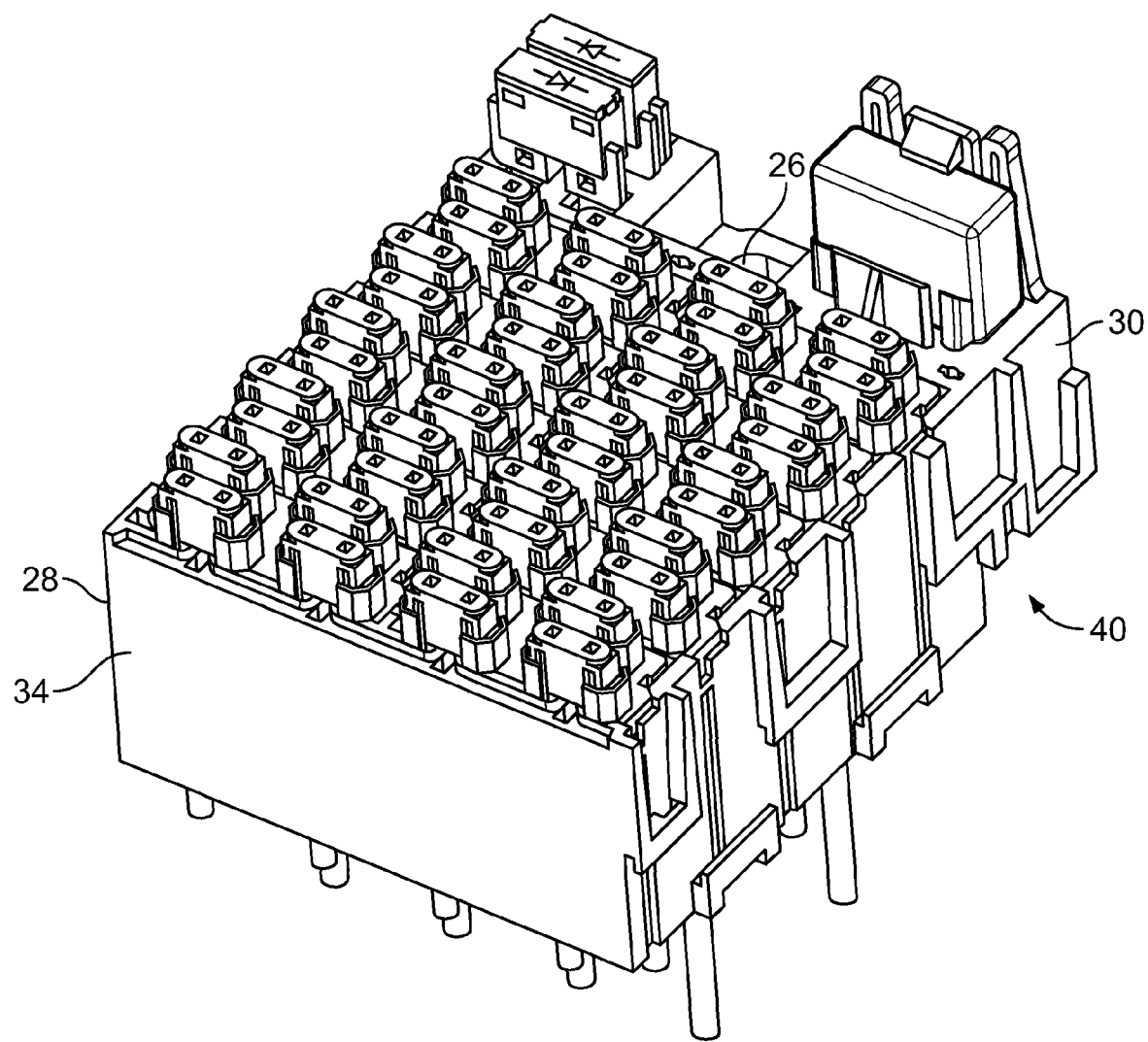

FIGS. 1 and 1A show a modular container 12 that is configured to receive, i.e., be populated with, electrical components such as fuses 18, diodes 20 and circuit breakers 22. Modular container 12 is constructed of a dielectric material, such a heat resistant plastic or other suitable material. In one embodiment, modular container 12 is configured with interchangeable internal features to receive like electrical components. Examples of like components include, but are not limited to fuses 18, diodes 20 and circuit breakers 22 of different current or voltage capacities. In one embodiment, modular container 12 includes two sets of opposed sides 28, 30 and 34, 36. Adjacent to side 36, a recess 24 is formed in modular container 12 forming a web 38 having at least one aperture 26 for receiving a fastener (not shown) for securing modular container 12 in an installed position in the vehicle.

Figure 2:
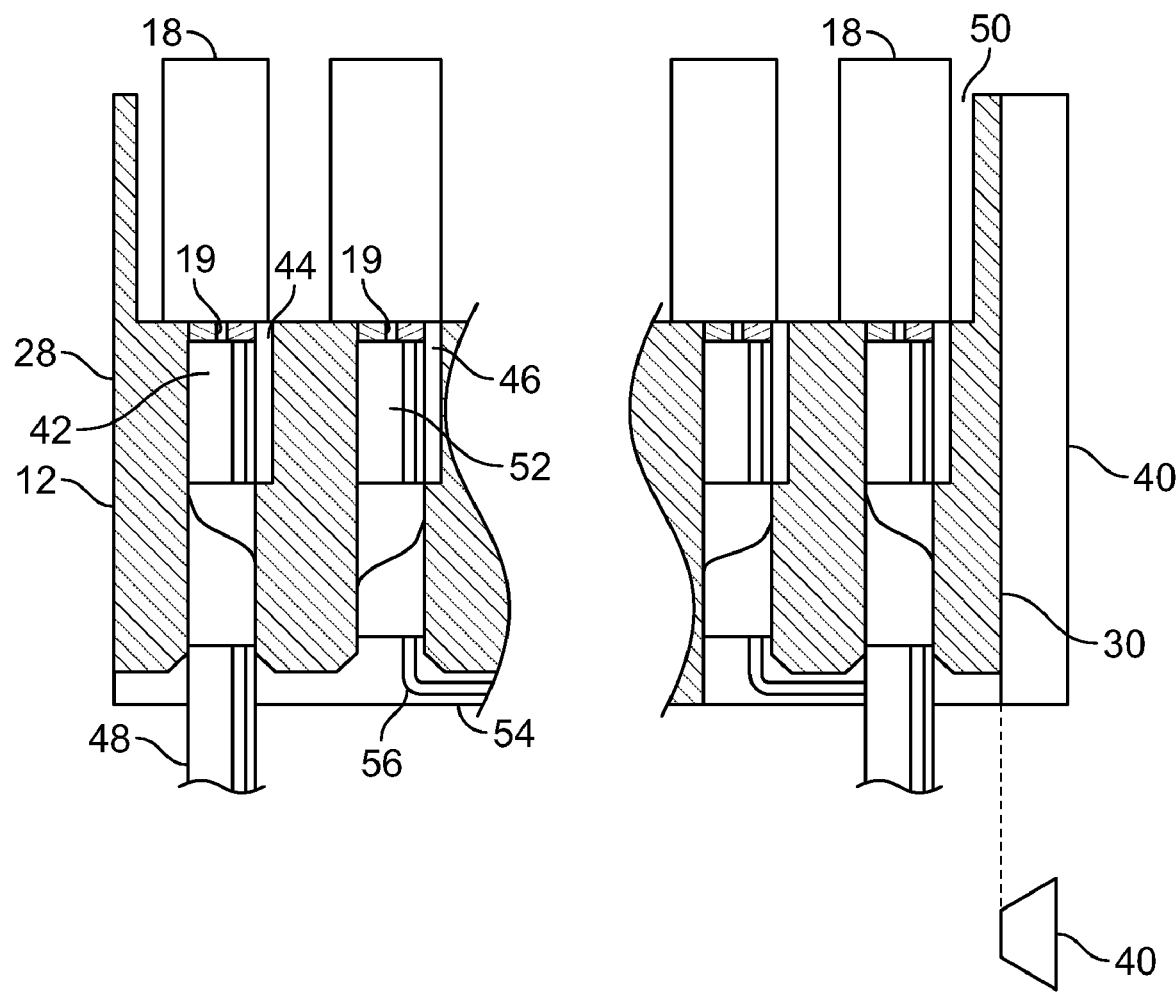
FIG. 2 is a cross-section taken along line 2-2 of FIG. 1 of the present invention.

In one embodiment of modular container 12, as shown in FIG. 2, which is a cross-section taken along line 2-2 of FIG. 1, a structural arrangement is provided for receiving a row of fuses 18 in a recess 50 formed in the container. Arranged pairs of terminal apertures 44, 46 are formed in modular container 12 to receive one of the two corresponding leads 19 for each fuse 18. A female box terminal 42 is inserted inside each aperture 44 to receive one lead 19 of fuse 18. Similarly, a female box terminal 52 is inserted inside each aperture 46 to receive the other lead 19 of fuse 18. A lead 48 of a vehicle wiring harness (see e.g., wiring harness 106 of FIG. 8) is directed inside aperture 44 opposite recess 50 and mated with terminal 42. A bus bar 54 including a male blade terminal 56 disposed opposite recess 50 is inserted inside aperture 46 for mating with terminal 52. Retention features for retaining the various components in position are known in the art and not discussed further herein.

Referring back to FIGS. 1 and 2, modular container 12 includes a mating feature 40 (FIG. 1A) associated with side 30. Mating feature 40, which defines a dovetail profile in one embodiment, is configured to interconnect with a mating feature 72 formed in a side 62 of a modular container 14 (see FIG. 3), the interconnected modular containers 12, 14 shown in FIG. 5 including an interlocking joint. It is appreciated that other mating feature constructions may be used to interconnect or interlock or otherwise engage adjacent modular containers, and that one or more of the modular containers may include one or more features that correspond to one or more sides of the modular container for interconnecting, interlocking or otherwise engaging multiple modular containers.

Figure 3:
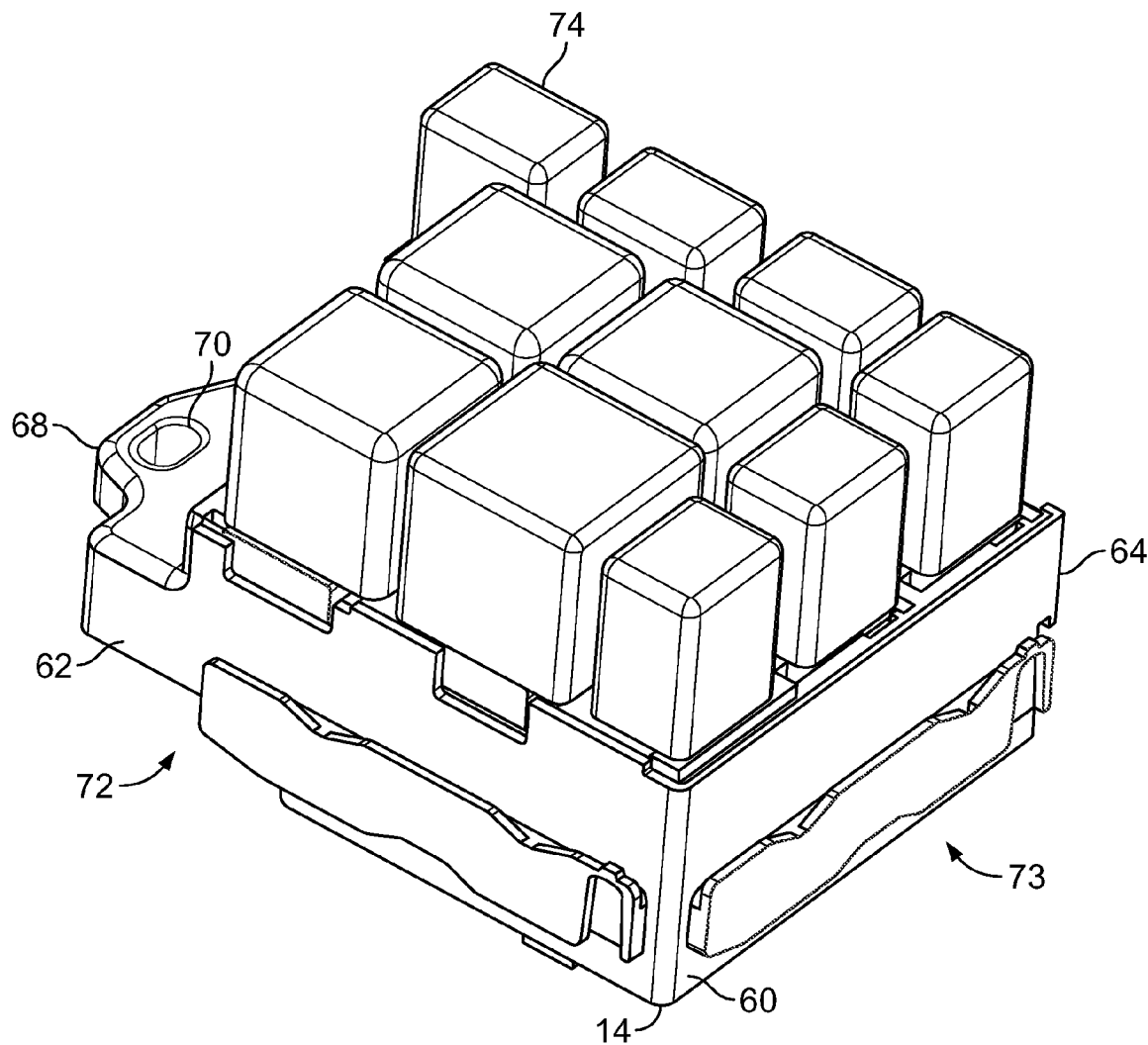
FIG. 3 is a top perspective view of an alternative modular container embodiment of the present invention.

As further shown in FIGS. 3, 5 and 6 modular container 14 includes pairs of opposed sides 58, 60 and 62, 64 and is configured to receive electrical components 74, such as relays in a manner known in the art. As further shown in FIG. 3, a feature 73 similar to mating feature 40 in FIG. 2 is associated with side 60 for interconnecting with a mating feature 88 of a fixturing module 16 (FIG. 4), shown interconnected in FIG. 5. In an alternate embodiment of fixturing module 16, a fixturing module 16' contains electrical components and similar to fixturing module 16, provides improved structural support for the assembled electrical distribution assembly 10, 100 (FIGS. 5 and 6). In one embodiment, these mating features are interchangeable so that they may mate with mating features of other modular container constructions. In one embodiment, a recess 66 (FIG. 6) is formed in modular container 14 forming a web 68 having at least one aperture 70 for receiving fasteners (not shown) for securing modular container 14 in an installed position in the vehicle.

Figure 4:
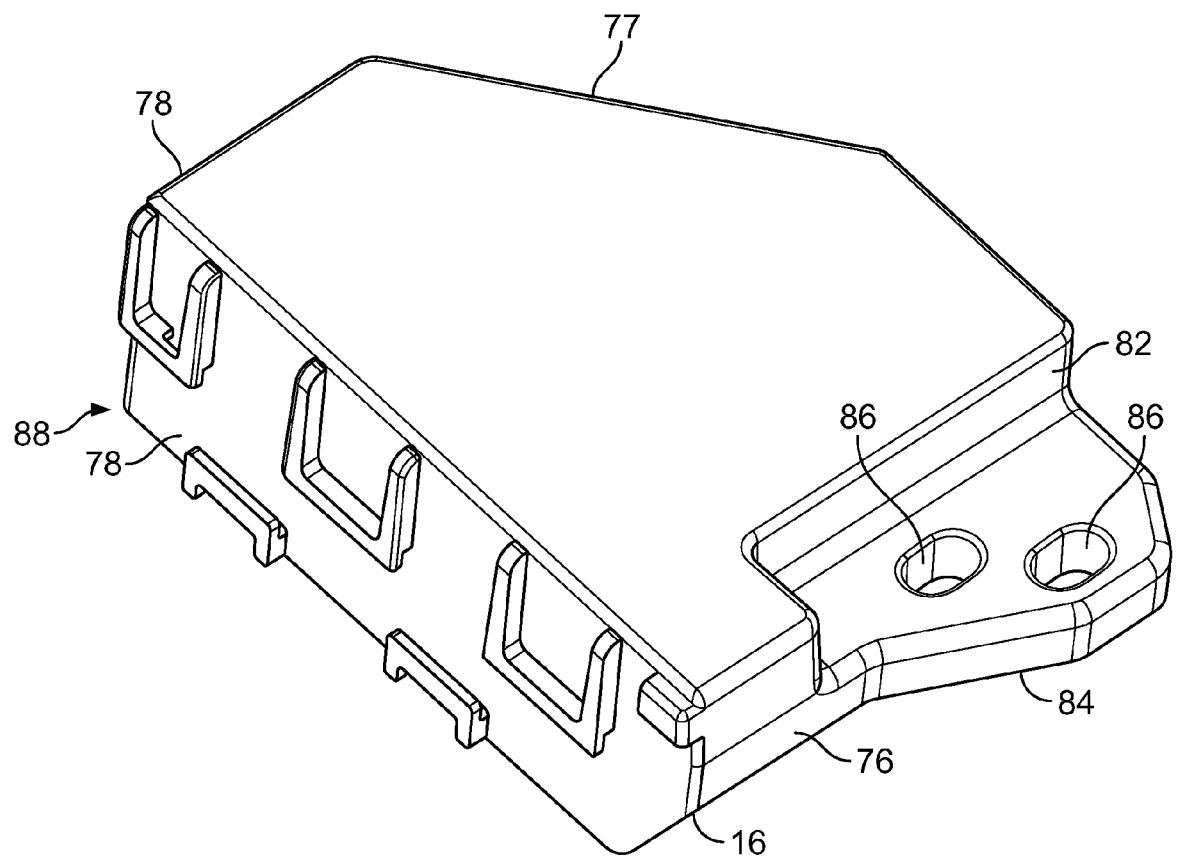
FIGS. 4 and 4A are top perspective views of embodiments of a fixturing module of the present invention.
Figure 4A:
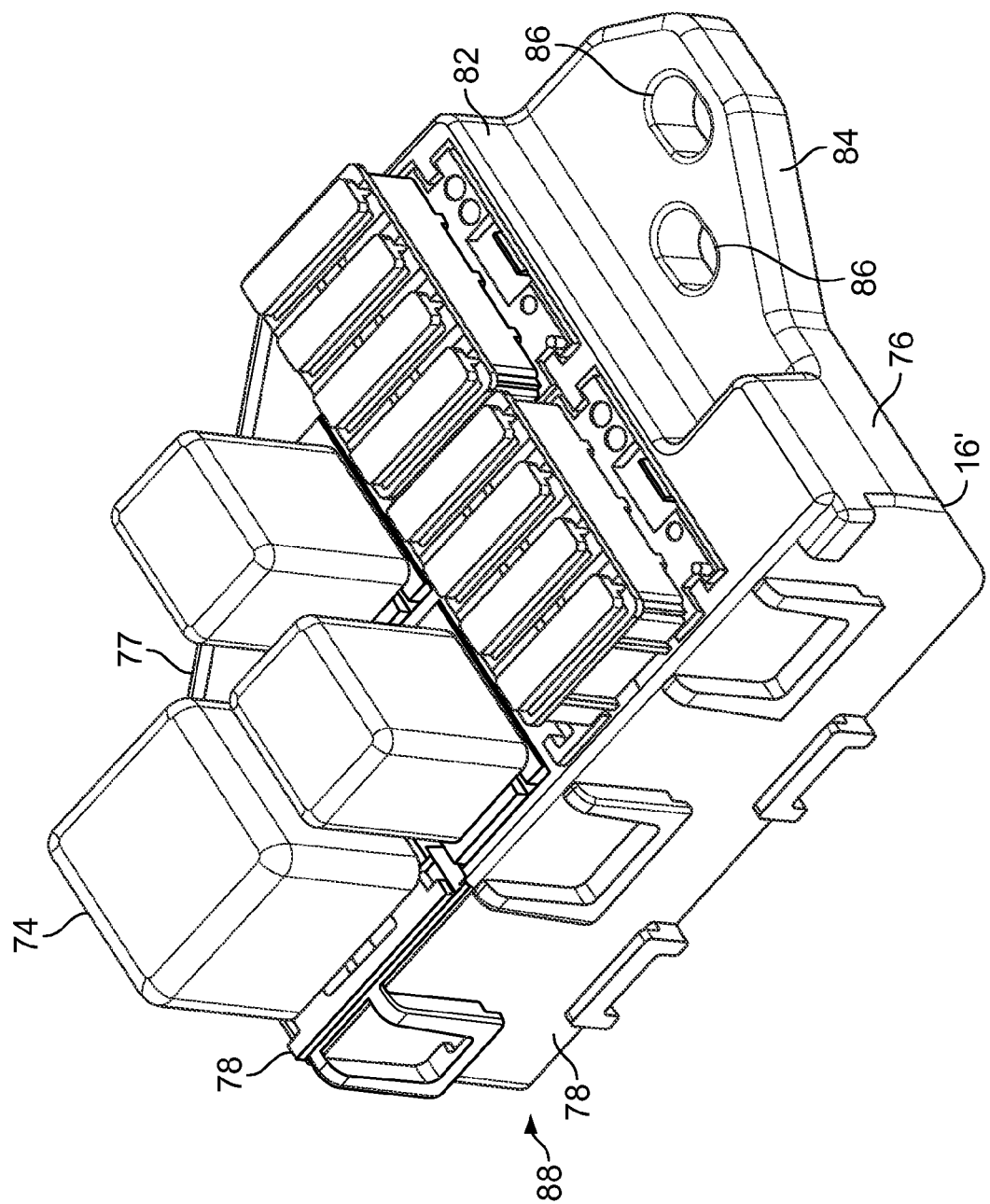

As further shown in FIG. 4, fixturing module 16 may be used to provide additional support for interconnected electrical power distribution assemblies, such as shown for electrical power distribution assembly 10 in FIG. 5. That is, in FIGS. 5, 6 respective fixturing module 16, 16' provides structural support to avoid a cantilevered arrangement for electrical power distribution assembly 10, 100. In other words, without fixturing module 16 or 16' (FIG. 4 or 4A), aperture 26 of modular container 12 and apertures 70 of modular container 14 which receive fasteners to support power distribution assembly 10, 100 are disposed on only one side of the power distribution assembly 10. Fixturing module 16, as shown, includes sides 76, 77, 78, 80. Adjacent to side 76, a recess 82 is formed in fixturing module 16 forming a web 84 having at least one aperture 86 for receiving a fastener (not shown) for securing fixturing module 16 in an installed position in the vehicle. Fixturing module 16 may be fabricated into any suitable size and/or shape to accommodate space into which the electrical power distribution assembly 10 is to be installed. Fixturing module 16 interconnects with adjacent modular containers, providing the assembled electrical power distribution assembly with an enhanced connection interface with the vehicle, permitting the other modular containers to be fabricated to include structure at only one portion of the modular container for securing the modular container to a vehicle (see webs 38, 68 in FIGS. 1, 3 for corresponding modular containers 12, 14). In one embodiment, multiple fixturing modules 16 may be used for interconnecting to opposed sides of assembled electrical power distribution assemblies, so that none of the modular containers would be required to include webs with apertures for receiving fasteners to secure the electrical power distribution assembly. In such a construction, the modular containers could be constructed in a more compact arrangement, especially when multiple modular containers are employed.

Figure 8:
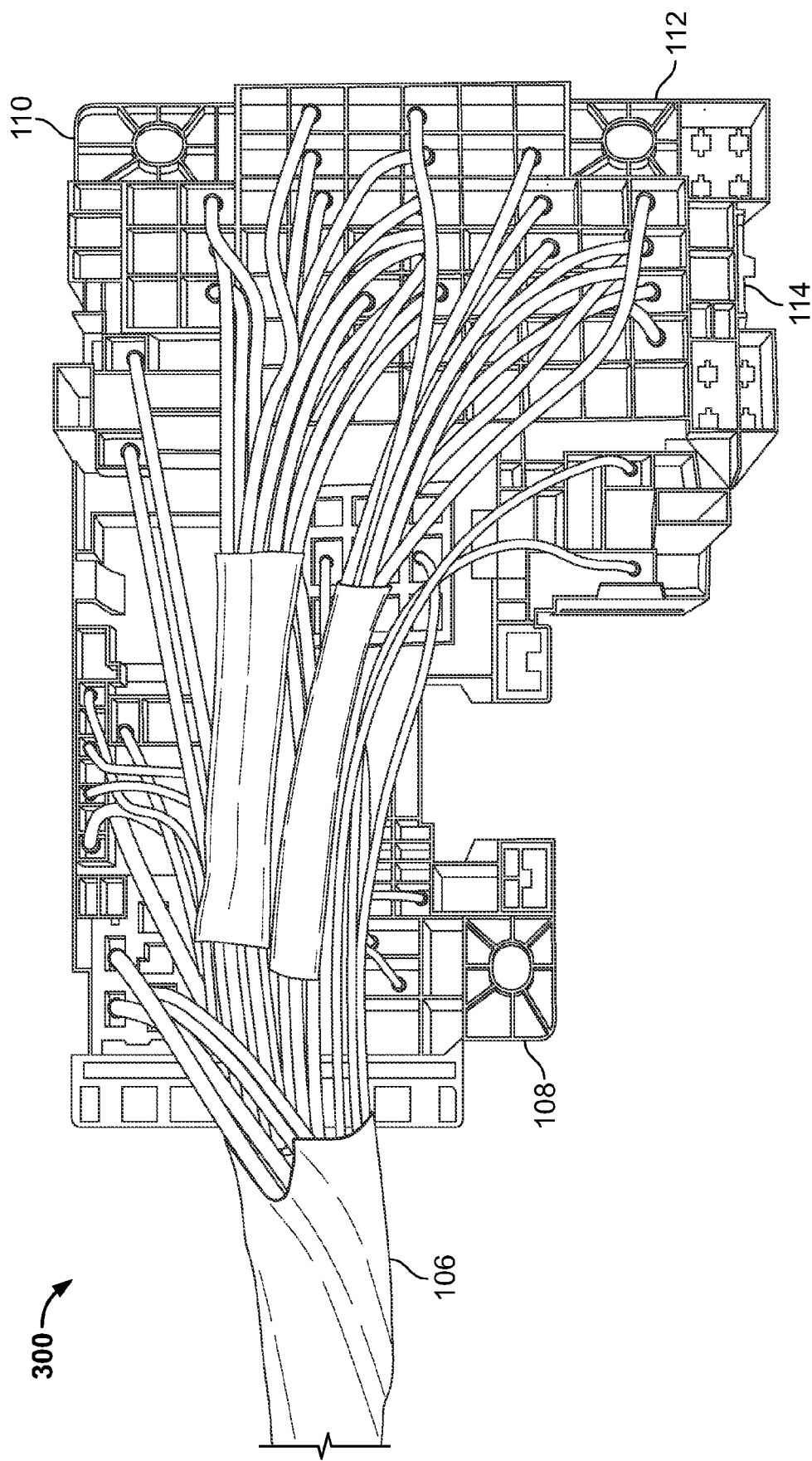
FIG. 8 is a bottom view of an embodiment of an electrical power distribution assembly of the present invention with wiring harness attached.

As shown in FIG. 5, modular containers 12, 14 are interconnected, and modular container 14 is also interconnected with fixturing module 16 to form an assembled electrical power distribution assembly 10. Electrical power distribution assembly 10 corresponds to the electrical system components installed in one model, or version, of a vehicle. A wire guide 90 is secured to surfaces of modular containers 12, 14 opposite the electrical components mounted in the containers to assist with the insertion of leads of the vehicle wiring harness into the corresponding apertures of the modular containers. FIG. 8 shows a bottom view of an electrical power distribution assembly 300 in which leads of a wiring harness 106 are inserted inside corresponding apertures of modular containers 108, 110, 112 through wire guide 114.

As shown in FIG. 6, modular containers 12, 14 are interconnected, and modular container 14 is also interconnected with fixturing module 16' to form an assembled electrical power distribution assembly 100. Electrical power distribution assembly 10 corresponds to the electrical system components installed in one model, or version, of a vehicle. A wire guide 90 is secured to surfaces of modular containers 12, 14 opposite the electrical components mounted in the containers to assist with the insertion of leads of the vehicle wiring harness into the corresponding apertures of the modular containers.

FIG. 7 shows an alternate embodiment of an assembled electrical power distribution assembly 200, in which a pair of modular containers 14 are interconnected with one another and also with one modular container 12. Electrical power distribution assembly 200 corresponds to the electrical system components installed in a different model, or version, of the same vehicle using electrical power distribution assembly 100. A wire guide 92 is secured to surfaces of modular containers 12, 14, 14 opposite the electrical components mounted in the containers to assist with inserting leads of the vehicle wiring harness into the corresponding apertures of the modular containers.

It is to be understood that modular containers 12, 14, 16' may contain terminal position assurance (TPA), as is known in the art and not further discussed herein, to ensure that terminals are installed correctly in the modular containers.

Although the modular container arrangements shown are rectangular, it is to be understood that other geometries may be used. Similarly, other fixturing module geometries may be used.

Figure 9:
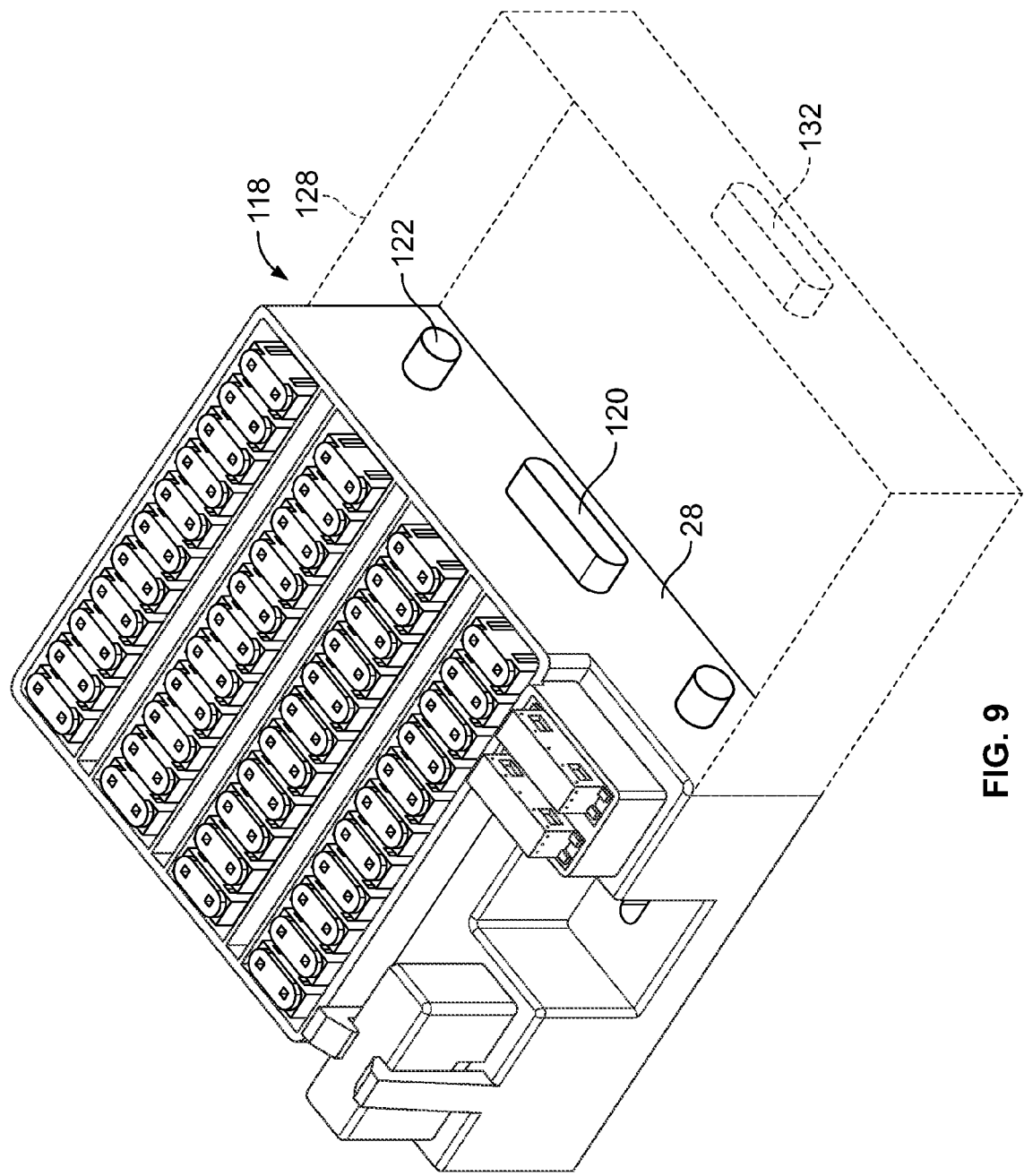
FIG. 9 is a top perspective view of an alternate embodiment of a modular container of the present invention.

FIG. 9 shows a modular container 118, which is an alternate embodiment of and otherwise similar to modular container 12. Modular container 118 is configured so that electrical leads corresponding to each of the electrical components are routed to an electrical connector 120. Electrical connector 120 and features 122 correspond to side 28, but in alternate embodiments correspond to one or more of the other sides. A corresponding modular container 128 includes a mating electrical connector and features. It is appreciated that when interconnected to adjacent modular container 128 along side 28 of modular container 118, the adjacent modular container 128 not only mechanically interconnects with modular container 118, but also electrically interconnects with modular container 118. In addition, modular container 128 may include an electrical connector 132 for interconnecting with the vehicle wiring harness, simplifying the interconnection between the electrical power distribution assembly and the vehicle wiring harness.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A modular electrical power distribution assembly comprising:
   a plurality of modular containers, each container configured to receive a plurality of electrical components for interconnection directly to corresponding leads of a wiring harness of a predetermined configuration;
   each container having at least one sidewall with a mating feature positioned thereon, a first mating feature of one respective container configured to cooperate with a second mating feature of an adjacent container to maintain the plurality of containers in mechanical interconnection with each other; and
   a wire guide secured to the plurality of containers, the wire guide assists with the insertion of the leads of the wiring harness into corresponding apertures of the plurality of containers.

2. The power distribution assembly of claim 1, wherein each of the plurality of modular containers have electrical leads which extend from a side of each respective modular container, the electrical leads are in electrical engagement with the electrical component, whereby as the modular containers are mated together, the electrical leads place adjacent modular containers in electrical interconnection.

3. The power distribution assembly of claim 1, further including a fixturing module configured for interconnection with at least one container of the plurality of containers.

4. The power distribution assembly of claim 1, wherein the plurality of containers include webs with at least one aperture for securing the respective containers in an installed position.

5. The power distribution assembly of claim 1, wherein the mating features forms an interlocking joint.

6. The power distribution assembly of claim 1, wherein the plurality of containers include terminal position assurance.

7. The power distribution assembly of claim 1, wherein at least two modular containers of the plurality of modular containers are configured for electrical interconnection.

8. A method of making a modular electrical power distribution assembly, the steps comprising:
   providing a plurality of modular containers, each container configured to receive a plurality of electrical components for interconnection directly to corresponding leads of a wiring harness of a predetermined configuration;
   installing the electrical components in each of the plurality of containers, the electrical components being positioned in electrical engagement with the corresponding leads of the wiring harness;
   mechanically interconnecting the plurality of containers, each container having at least one sidewall with a mating feature positioned thereon, the mating feature cooperating with a mating feature of an adjacent container to maintain the plurality of containers in mechanical interconnection with each other; and
   inserting the leads of the wiring harness through a wire guide secured to the plurality of containers, the wire guide assisting with the insertion of the leads of the wiring harness into corresponding apertures of the plurality of containers.

9. The method of claim 8, wherein the step of installing electrical components includes installing interchangeable like electrical components.

10. The method of claim 8, wherein the step of mechanically interconnecting the plurality of containers includes electrically interconnecting the plurality of containers.

11. The method of claim 8, further including a fixturing module configured for interconnection with at least one container of the plurality of containers.

12. The method of claim 8, wherein at least one set of adjacent containers of the plurality of containers includes mating features.

13. The method of claim 12, wherein the mating features form an interlocking joint.

14. The power distribution assembly of claim 8, wherein the plurality of containers include terminal position assurance.

15. A vehicle comprising:
   a frame supporting a propulsion device and electrical systems for use with electrical components of the vehicle;
   the frame supporting a plurality of modular containers and at least one fixturing module, each container configured to receive a plurality of electrical components for interconnection directly to corresponding leads of a wiring harness for a predetermined vehicle configuration, the fixturing module providing structural support to the plurality of modular containers;
   each container and the fixturing module having a mating feature positioned thereon, the mating features cooperate to maintain the plurality of containers in mechanical interconnection with each other; and
   a wire guide secured to the plurality of containers, the wire guide assists with the insertion of the leads of the wiring harness into corresponding apertures of the plurality of containers.

16. The vehicle of claim 15, wherein the plurality of containers are configured for electrical interconnection.

17. The vehicle of claim 15, wherein at least one container of the plurality of containers includes interchangeable features to receive like electrical components.

18. The vehicle of claim 15, wherein adjacent containers of the plurality of containers include mating features.

* * * * *